(12) United States Patent
Morein

(10) Patent No.: US 9,404,594 B2
(45) Date of Patent: Aug. 2, 2016

(54) MULTI-CHAMBER THERMAL MANAGEMENT ROTARY VALVE MODULE

(71) Applicant: Schaeffler Technologies AG & Co. KG, Herzogenaurach (DE)

(72) Inventor: Alexander Joseph Morein, Royal Oak, MI (US)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 0 days.

(21) Appl. No.: 14/728,157

(22) Filed: Jun. 2, 2015

(65) Prior Publication Data

US 2015/0354714 A1    Dec. 10, 2015

Related U.S. Application Data

(60) Provisional application No. 62/007,569, filed on Jun. 4, 2014.

(51) Int. Cl.

| | | |
|---|---|---|
| *F16K 11/14* | (2006.01) | |
| *F16K 11/076* | (2006.01) | |
| *F16H 1/28* | (2006.01) | |
| *F16K 31/53* | (2006.01) | |
| *F16K 11/085* | (2006.01) | |
| *F01P 7/14* | (2006.01) | |

(52) U.S. Cl.
CPC .............. *F16K 11/076* (2013.01); *F16H 1/28* (2013.01); *F16K 11/0856* (2013.01); *F16K 31/535* (2013.01); *F01P 2007/146* (2013.01); *Y10T 137/86863* (2015.04)

(58) Field of Classification Search
CPC ...................................................... F16K 11/165
USPC ......................................... 137/637.3, 630.27
See application file for complete search history.

(56) References Cited

U.S. PATENT DOCUMENTS

| 1,357,081 | A | * | 10/1920 | Quinn | ................... B60R 25/042 |
| | | | | | 137/552.5 |
| 4,570,663 | A | * | 2/1986 | Gould | ................... F16K 11/166 |
| | | | | | 137/119.07 |
| 4,817,656 | A | * | 4/1989 | Gould | ................... F16K 11/166 |
| | | | | | 137/118.06 |
| 4,921,598 | A | * | 5/1990 | Desch | ....................... C02F 1/42 |
| | | | | | 137/599.15 |
| 5,036,816 | A | * | 8/1991 | Mann | ..................... F02D 11/107 |
| | | | | | 123/336 |
| 5,090,658 | A | | 2/1992 | Kusmer | |
| 5,647,399 | A | * | 7/1997 | Andersen | ........... B60H 1/00842 |
| | | | | | 137/637.3 |
| 8,419,588 | B2 | | 4/2013 | Palfai et al. | |
| 2013/0140475 | A1 | | 6/2013 | Burgess et al. | |
| 2013/0140476 | A1 | | 6/2013 | Burgess et al. | |

FOREIGN PATENT DOCUMENTS

DE        102006055536        6/2008

\* cited by examiner

*Primary Examiner* — John Fox
(74) *Attorney, Agent, or Firm* — Volpe and Koenig, P.C.

(57) ABSTRACT

A rotary valve with ports connected to housing. A first valve body rotatably positioned in a housing flow chamber has a fluid pathway that connects a first and/or second port to the flow chamber in a first rotational position, and prevents flow from the first and/or second port in a second rotational position. A second valve body rotatably positioned in the flow chamber has at least one fluid pathway that connects a third and/or fourth port to the flow chamber in a first rotational position, and prevents flow from the third and/or fourth port in a second rotational position of the second valve body. An actuator positions of the first and second valve bodies, and includes an epicyclic gear arrangement for driving the second valve body such that movement of the actuator shaft that rotates the first valve body results in only a partial movement of the second valve body.

14 Claims, 7 Drawing Sheets

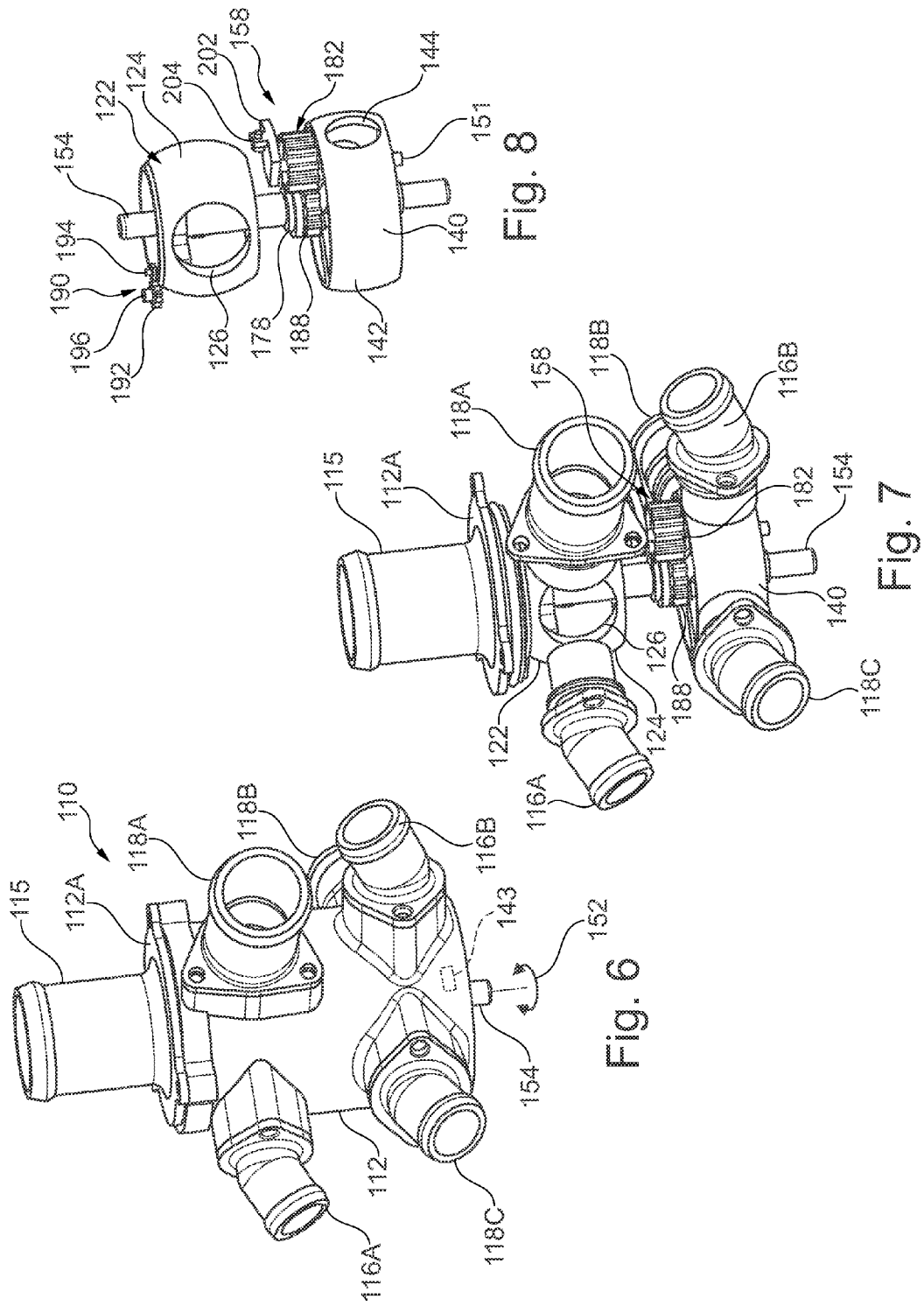

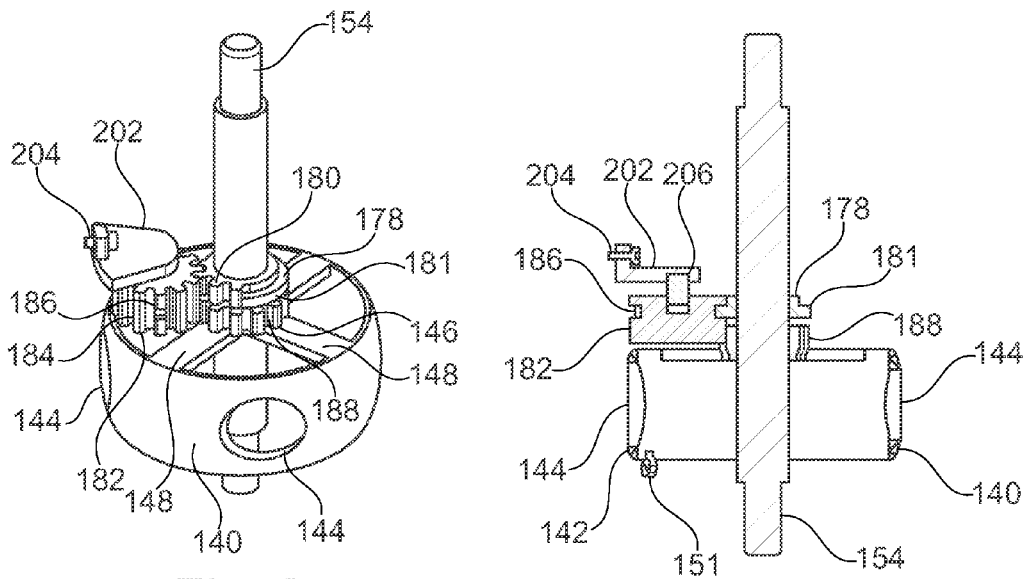
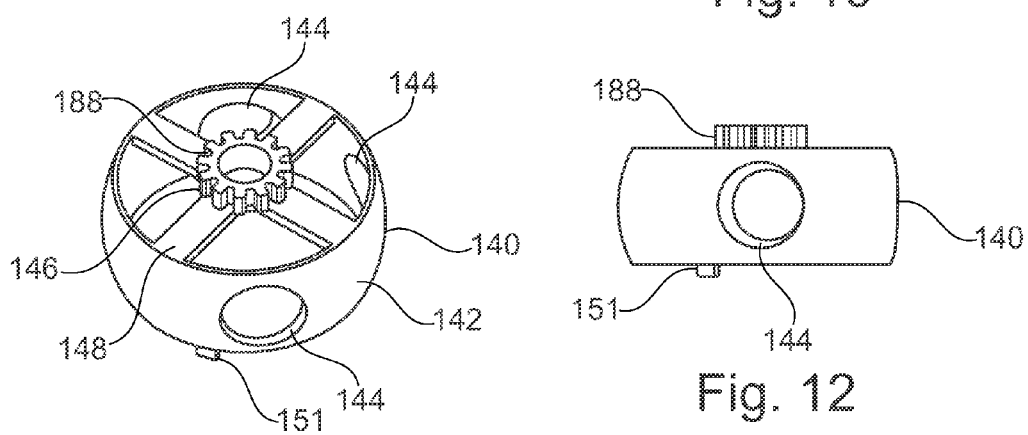
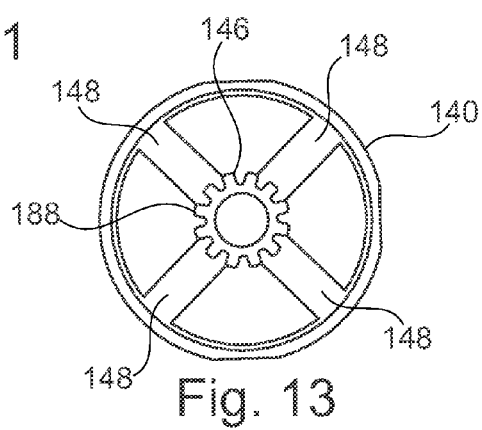

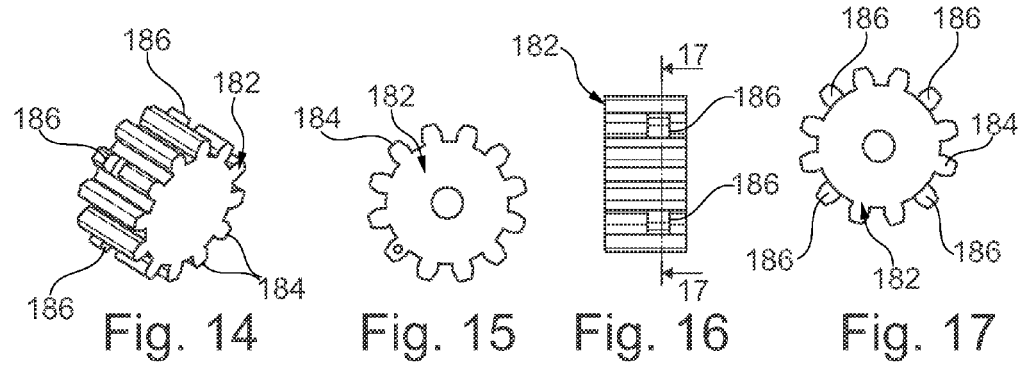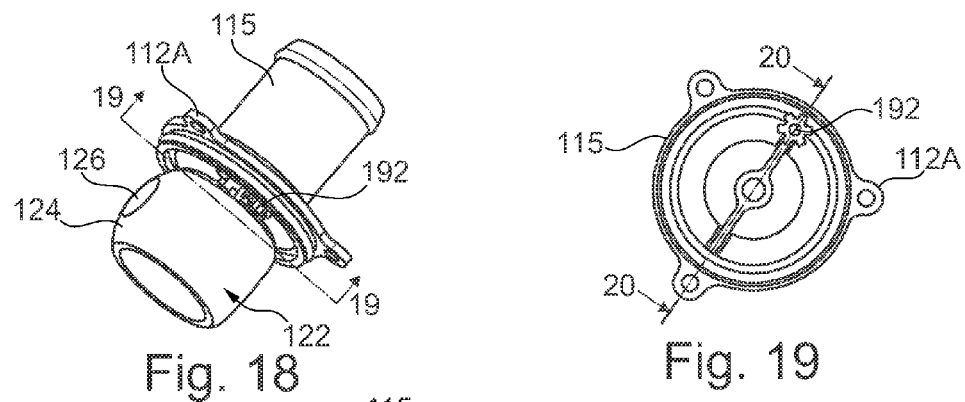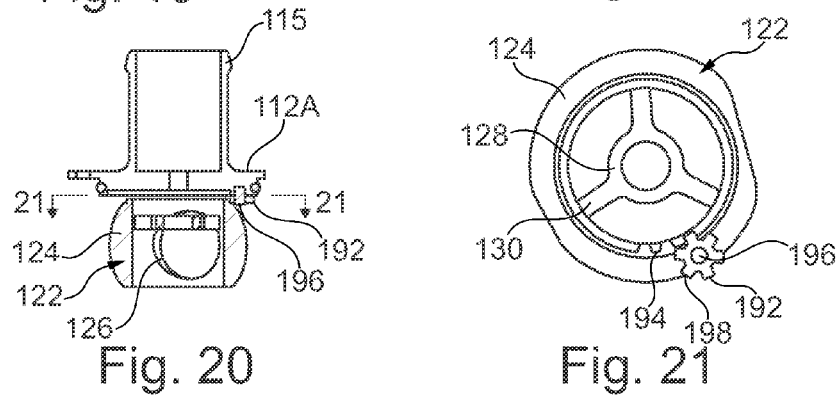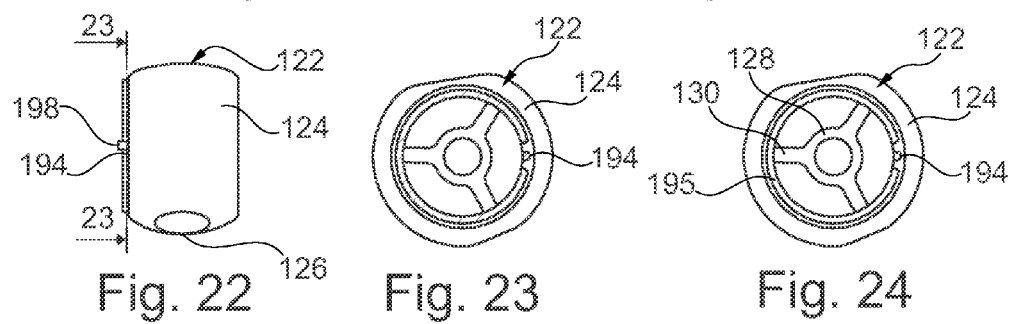

MULTI-CHAMBER THERMAL MANAGEMENT ROTARY VALVE MODULE

INCORPORATION BY REFERENCE

The following documents are incorporated herein by reference as if fully set forth: U.S. Provisional Application No. 62/007,569, filed Jun. 4, 2014.

FIELD OF INVENTION

The present invention relates rotary valve modules, and in particular to thermal management system rotary valve modules used to direct coolant flows in vehicles, particularly for direction of coolant fluid flows in connection with the engine and various other systems in motor vehicles.

BACKGROUND

In automotive applications, there is a push for energy efficiency. One way to increase efficiency of motor vehicles is to control the coolant flows to and from the internal combustion engine so that the engine operates at an optimal operating temperature. It has been known to use switchable coolant pumps so that the coolant flow is switched off while the engine heats up from a cold start more quickly. Additionally, throttling of coolant flows is also known using a thermal management module with a rotary valve body; however, the known thermal management module valves only include provisions for providing the coolant at a single outlet temperature.

One known prior art valve used in connection with a thermal management system is disclosed in DE 10 2006 055 536. In this case, a rotary valve having two coaxial rotary valve bodies located within a housing are provided. Here the inlet is in an axial direction and, depending upon the location of the coaxial valve bodies, the coolant flow is directed to a first or second outlet that can be separately switched off and on in order to control the flow of coolant from the water pump to various heat exchangers used in connection with the engine and various other systems, such as an oil cooler. However, there is no possibility for providing different outlet temperatures from the device. Further, a separate actuator is required for each of the coaxial rotary valve bodies.

It would be desirable to provide a way for allowing coolant at different temperatures to be available to different motor vehicle systems and engine components. It would also be desirable to achieve this in a cost efficient manner within a minimum space requirement.

SUMMARY

Briefly stated, a rotary valve module is provided which includes a housing with a flow chamber. First, second, third, and fourth ports are connected to housing and in communication with the flow chamber. A first valve body is rotatably positioned in the flow chamber. The first valve body includes at least one fluid pathway that connects the first port and/or the second port to the flow chamber in a first rotational position, and prevents flow from the first port and/or the second port in a second rotational position. A second valve body is rotatably positioned in the flow chamber. The second valve body includes at least one fluid pathway that connects the third port and/or the fourth port to the flow chamber in a first rotational position of the second valve body, and prevents flow from the third port and/or the fourth port in a second rotational position of the second valve body. An actuator arrangement controls the positions of the first and second valve bodies, and includes an actuator shaft that extends axially through the valve bodies that is connected rotationally fixed to the first valve body, and includes an epicyclic gear arrangement for driving the second valve body such that movement of the actuator shaft results in only a partial movement of the second valve body. This allows for independent positioning of the first and second valve bodies using a single actuator connected to the shaft.

In one preferred arrangement, the epicyclic gear arrangement comprises a sun gear connected to the actuator shaft, the sun gear including a toothed segment extending only a portion of its circumference, a ring gear connected to the housing, and a planet gear supported on the second valve body that is engaged with the ring gear. The planet gear intermeshes with the sun gear toothed segment during only a part of each revolution of the actuator shaft.

In one aspect of the invention, an intermediate wall divides the flow chamber into first and second flow chambers, and the first valve body and the associated first and second ports are located in the first flow chamber and the second valve body and the third and fourth ports are located in the second flow chamber. The actuator shaft passes through the intermediate wall. This allows for the possibility of two isolated flow chambers within the same housing.

In a preferred aspect of the invention, the valve bodies are spherical frustums or spheroids.

In another preferred arrangement, the epicyclic gear arrangement comprises a drive gear located on the actuator shaft, the drive gear includes a toothed segment extending only a portion of its circumference and a shelf on a non-toothed portion that allows for disengagement from an idler gear. The idler gear is rotatably mounted on the housing and is engagable with the toothed segment of the drive gear. The idler gear includes a cut feature through at least some of the teeth that allows the drive gear to rotate without engaging the idler gear when the drive gear teeth are not in contact with the idler gear teeth. A driven gear is attached to the second valve body and is engagement with the idler gear. Movement of the drive gear when the toothed segment is in engagement with the idler gear results in a rotary positioning movement of the second valve body.

This arrangement also provides a locking feature to prevent movement of the second valve body when the toothed segment of the drive gear is out of engagement with the idler gear teeth. Here, the shelf on the drive gear rotates through the cut feature on one of the idler gear teeth, and the absence of the cut on neighboring teeth prevents the idler gear from rotating, locking the idler gear and the driven gear that is attached to the second valve body in position.

In a preferred aspect, a stop feature is located on the second valve body that can engage against a feature on the housing in order to provide a hard stop for position verification and calibration purposes.

In a further preferred aspect of the invention, a stop function is also provided for the first valve body for position verification and/or calibration purposes, and which allows for multiple complete rotations of the first valve body to allow for positioning of the second valve body.

In one preferred arrangement, the stop function is provided by a stop idler gear that engages with a partial gearing on the first valve body. The stop idler gear is mounted to freely rotate on a pin mounted on the housing. The stop idler gear operates in a locking fashion with the partial gearing similar to idler gear with the drive gear used to drive the second valve body. As first valve body rotates through a full rotation, it steps forward the idler gear by a set number of teeth. The stop idler gear can incorporate a stop projection that contacts a fixed counter-stop located on the housing or on a fixed port, such as the valve inlet.

An intermediate wall can also be provided between the valve bodies in the housing to define independent first and second flow chambers.

In a preferred aspect, the valve bodies are spherical frustums or spheroids.

The rotary valve modules are particularly useful as thermal module control valves for use in connection with a motor vehicle engine cooling system.

This arrangement can be used in connection with internal combustion engines so that heat from the engine block can be directly recirculated via the water pump as the engine comes up to operating temperature in order to allow it to reach an operating temperature more quickly. Thereafter, fluid from the first flow chamber that is set at a desired temperature can be maintained by mixing either the directly recirculated heated fluid from the engine with fluid from the radiator in order to maintain the engine at a desired operating temperature. At the same time, fluid from the second flow chamber can be independently mixed in order to provide fluid from the cooling system at a different temperature to an additional heat exchanger, which can be, for example, a passenger compartment heat exchanger, an oil cooler heat exchanger, a transmission fluid cooler heat exchanger, an EGR cooler, etc.

This arrangement can also be used for an electric vehicle or a hybrid vehicle where the heat source can be the battery pack or fuel cell module which also requires cooling, and cooling fluid at different temperatures can be provided for cooling the battery pack and the passenger compartment heat exchanger.

BRIEF DESCRIPTION OF THE DRAWINGS

The foregoing Summary and the following detailed description will be better understood when read in conjunction with the appended drawings, which illustrate a preferred embodiment of the invention. In the drawings:

FIG. 6 is a perspective elevational view of a second embodiment of a rotary valve module in accordance with the present invention.

FIG. 7 is a view similar to FIG. 6 with the housing removed to show two valve bodies located within the rotary valve module of FIG. 6.

FIG. 8 is a perspective elevational view similar to FIG. 7 showing the two valve bodies mounted on an actuator shaft with the inlet and outlet ports removed.

FIG. 9 is a perspective view showing the second valve body assembled with the actuator shaft.

FIG. 10 is a cross-sectional view through the second valve body and actuator shaft shown in FIG. 9.

FIG. 11 is a detailed perspective view of the second valve body.

FIG. 12 is an elevational view of the second valve body shown in FIG. 11.

FIG. 13 is a top plan view of the second valve body shown in FIG. 11.

FIG. 14 is a perspective view of an idler gear used in connection with the actuator shaft for driving the second valve body.

FIG. 15 is an elevational view of the idler gear shown in FIG. 14.

FIG. 16 is a side view of the idler gear shown in FIG. 15.

FIG. 17 is a cross-sectional view taken along line 17-17 in FIG. 16.

FIG. 18 is a perspective view showing the first valve body and an axial inlet port of the rotary valve module shown in FIGS. 6-8.

FIG. 19 is a view taken along line 19-19 in FIG. 18.

FIG. 20 is a cross-sectional taken along line 20-20 of FIG. 19.

FIG. 21 is a view looking at the top of the first valve body taken along line 21-21 in FIG. 20.

FIG. 22 is a detailed view of the first valve body shown in FIGS. 7, 8, and 18-21.

FIG. 23 is a cross-sectional view taken along line 23-23 in FIG. 22.

FIG. 24 is an end view of the valve body shown in FIG. 22.

DETAILED DESCRIPTION OF THE PREFERRED EMBODIMENTS

Figure 1:
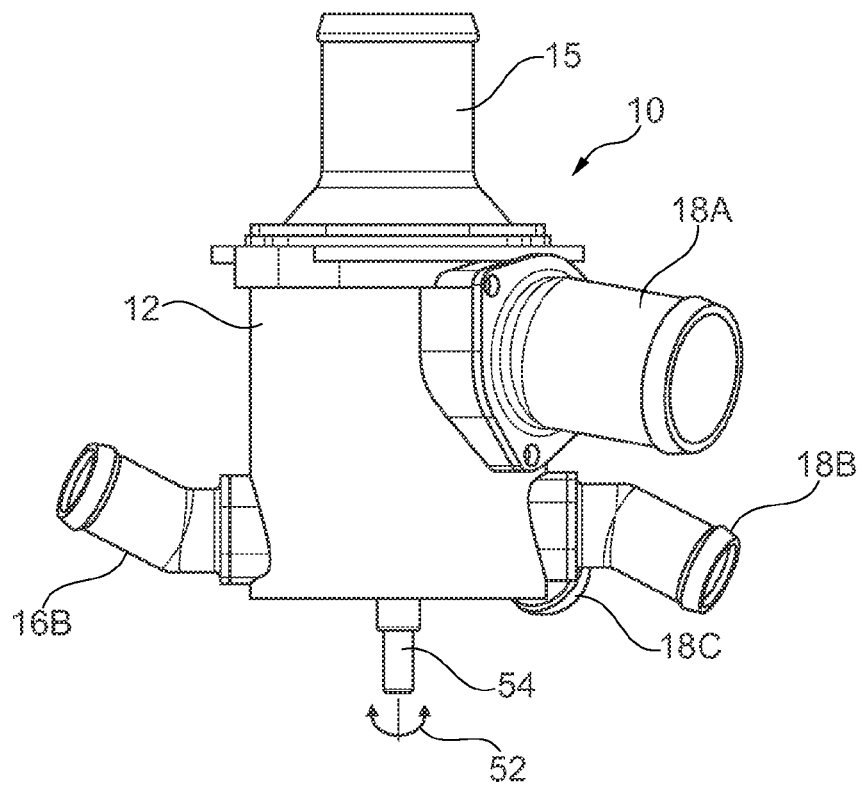
FIG. 1 is an elevational view of a first embodiment of a rotary valve module in accordance with the present invention.
Figure 2:
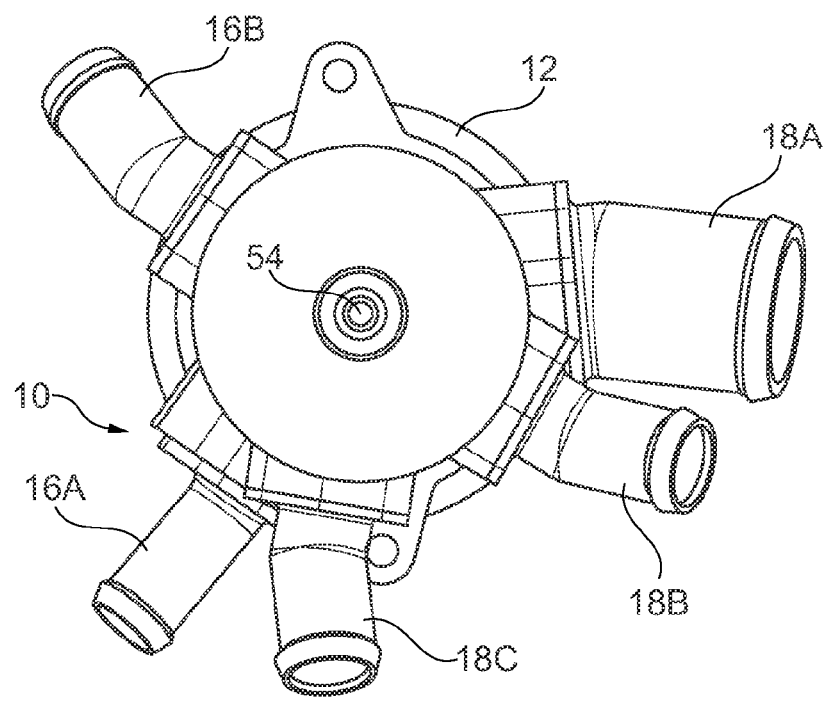
FIG. 2 is a bottom view of the rotary valve module of FIG. 1.

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. "Axially" refers to a direction along the axis of a shaft or rotating part. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Referring now to FIGS. 1-5, a first embodiment of a rotary valve module 10 is shown. The rotary valve module 10 can be used as a thermal management module for example in connection with motor vehicles in order to control several fluid communication pathways. In order to provide a number of pathways that can be held in various states or changed, depending upon a particular operating condition of the motor vehicle, multiple ports, including an axial inlet port 15 as well as first, second, third, and fourth radial ports 16A, 18A, 16B, 18B, which in one preferred arrangement comprise inlet ports 16A and 16B and outlet ports 18A and 18B, are provided on the housing 12 of the rotary valve module 10. One or more additional ports, for example an additional outlet port 18C, can also be provided on the housing 12. These inlet ports 15, 16A, 16B as well as outlet ports 18A, 18B, 18C are in communication with a flow chamber 14, indicated in FIG. 3, in the housing 12. While multiple inlet ports and outlet ports are shown, preferably the first port 16A and the second port 18A are associated with a first rotary valve body 22 rotatably positioned in the flow chamber 14 in the housing 12. The first valve body 22 includes at least one fluid pathway, preferably defined by at least one opening 26 in the outer wall 24 of the valve body 22, that connects at least one of the first port 16A or the second port 18A to the flow chamber 14 in a first rotational position of the valve body 22, and prevents flow from the at least one of the first port 16A or the second port 18A in a second rotational position. In the first rotational position, one or more openings 26 in the wall 24 of the first valve body 22 are at least partially aligned with the first port 16A and/or the second port 18A. The first valve body 22 is preferably supported via a hub 28 having one or more support arms 30 that extend to the outer wall 24. The hub 28 is preferably pressed onto an actuator shaft 54 which is described in further detail below.

Figure 3:
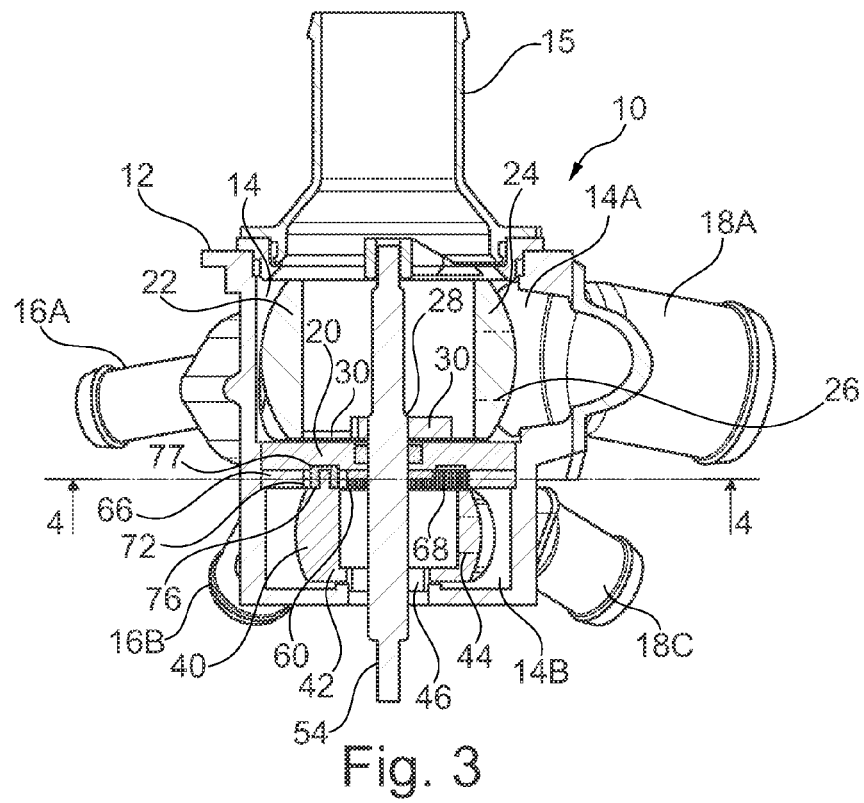
FIG. 3 is cross-sectional view through the rotary valve module of FIG. 1.

A second rotatable valve body 40 is rotatably positioned in the flow chamber 14. The third port 16B and the fourth port 18B are associated with the second rotatable valve body 40. In the arrangement shown, the flow chamber is divided into a first flow chamber 14A and a second flow chamber 14B by an intermediate wall 20, as shown in FIG. 3. The intermediate wall 20 separating the fluid chambers 14A, 14b could be integral to the housing 12, a separate insert, or there could be two separate housings joined together, with the intermediate wall 20 formed by the two separate housings. It would also be possible to have both the first valve body 22 and the second valve body 40 located within a common flow chamber without the intermediate wall 20.

The second valve body 40 preferably includes at least a second fluid pathway, preferably defined by at least one opening 44 which extends through the outer wall 42 of the second valve body 40. The second fluid pathway connects at least one of the third port 16B or the fourth port 18B to the flow chamber 14, or in the case of the embodiment shown with the intermediate wall 20, to the second flow chamber 14B, in a first rotational position of the second valve body 40. The second valve body 40 is rotatable into a second rotational position wherein it prevents flow from at least one of the third port 16B or the fourth outlet port 18B. This is accomplished by having the wall 42 of the second valve body either closing off the third port 16B and/or the fourth port 18B in the second rotational position. In the first rotational position, one or more openings 44 in the wall 42 of the second valve body are at least partially aligned with the third port 16B and/or the fourth port 18B.

As shown in FIG. 3, a bearing 46, which could be a plain bearing, roller bearing, or any other suitable bearing, is preferably located between the housing 12 and the axial end of the second valve body 40 in order to guide the rotation of the second valve body 40.

A rotary actuator represented by arrow 52 in FIG. 1 is connected to the actuator shaft 54 in order to position both the first valve body 22 and the second valve body 40. The rotary actuator can be an electric motor drive or any other suitable drive arrangement. The first valve body 22 is positioned via a direct rotational movement of the actuator shaft 54. In order to control the rotary position of the second valve body 40, an epicyclic gear arrangement 58 is provided that is connected to the actuator shaft 54, and drives the second valve body 40 such that movement of the actuator shaft 54 directly positions the first valve body 22 and results in only a partial rotary movement of the second valve body 40 in order to allow independent positioning of the first and second valve bodies via the single actuator 52 connected to the actuator shaft 54.

Figure 4:
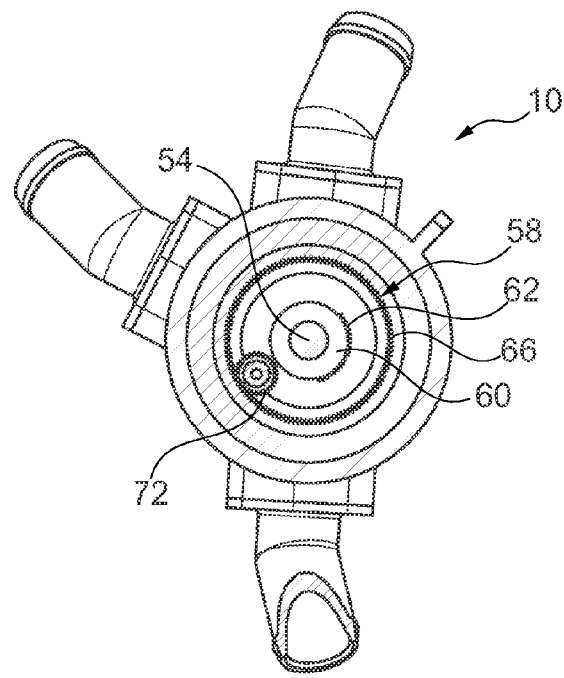
FIG. 4 is a cross-sectional view taken along line 4-4 in FIG. 3.
Figure 5:
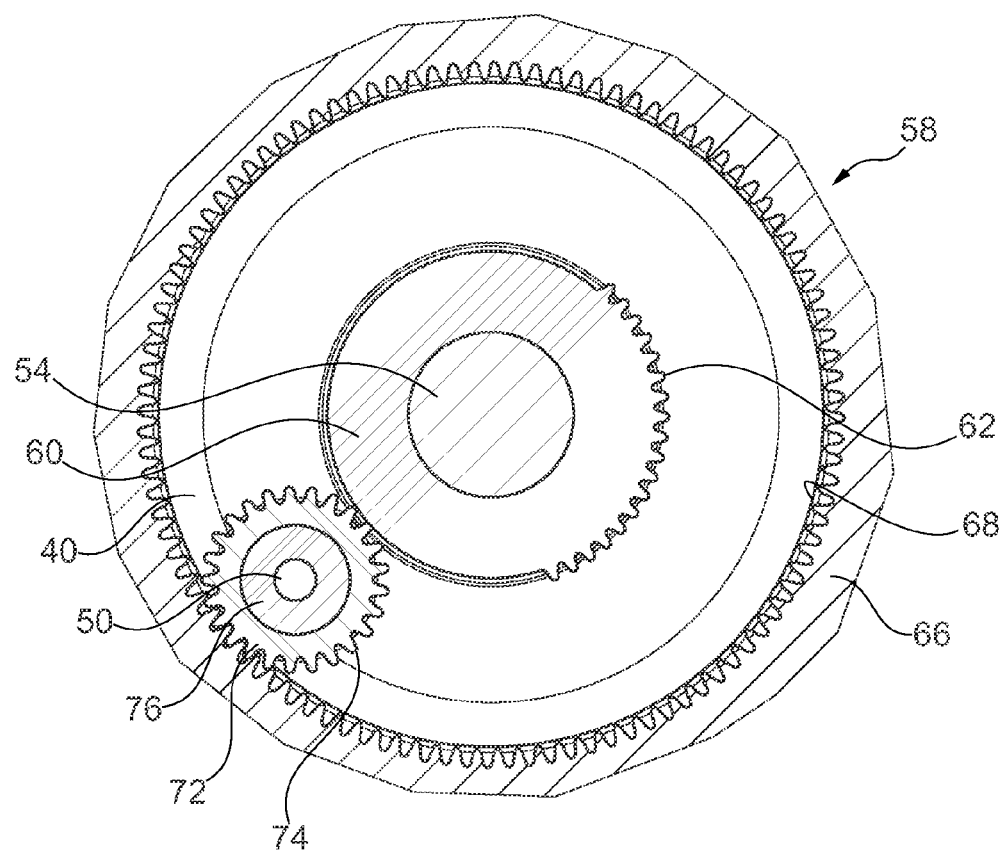
FIG. 5 is an enlarged view of an epicyclic gear arrangement used in the rotary valve module shown in FIGS. 1-4.
Figure 25:
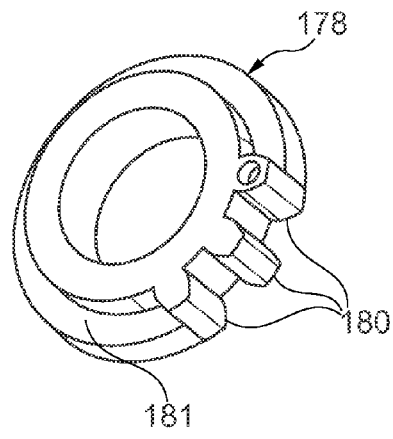
FIG. 25 is a perspective view of the drive gear for the first valve body shown in FIGS. 7-10.
Figure 26:
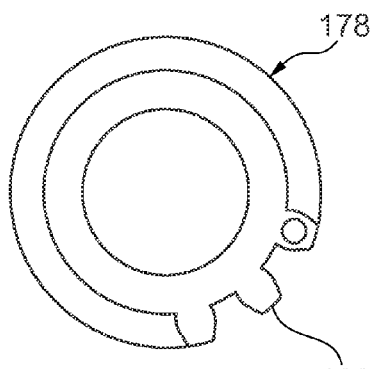
FIG. 26 is a top view of the drive gear of FIG. 25.
Figure 27:
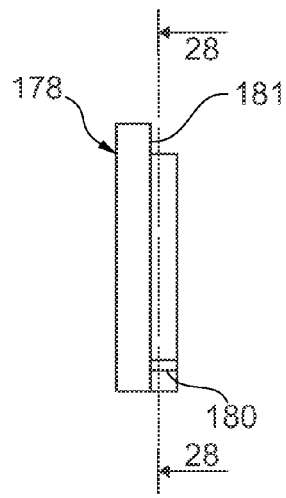
FIG. 27 is a side view of the drive gear of FIG. 25.
Figure 28:
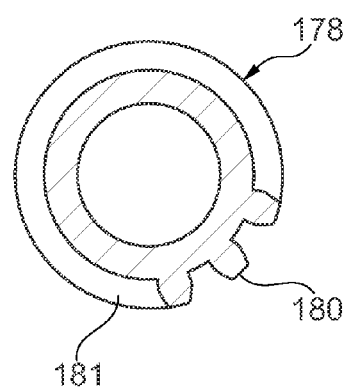
FIG. 28 is a cross-sectional view taken along line 28-28 in FIG. 27.

As shown in detail in FIGS. 3-5, the epicyclic gear arrangement 58 includes a sun gear 60 connected to the actuator shaft 54. The sun gear 60 includes a toothed segment 62 extending only on a portion of a circumference thereof. A ring gear 66 is connected to the housing 12 and includes gear teeth 68 that extend around an entire inner periphery of the housing 12 in proximity to the second valve body 40. A planet gear 72 is supported on the second valve body and is engaged with the ring gear 66. The planet gear 72 intermeshes with the toothed segment 62 of the sun gear 60 during only a part of each revolution of the actuator shaft 54. Based on this arrangement, the second valve body 40 is only rotated when this toothed segment 62 is in contact with the planet gear 72. This allows for a partial rotation of the second valve body 40 depending upon the number of teeth in the toothed segment 62 of the sun gear 60, so that, for example, a 45° or 90° rotation of the second valve body 40 can be made for each 360° revolution of the first valve body 22.

As shown in FIG. 3, the planet gear 72 is preferably supported on a pin 50 that extends from the second valve body 40. A bearing 76 is used to support the planet gear 72 on the pin 50 and preferably includes a guide feature 77 that interfaces with an annular recess in the intermediate wall 20. Using this arrangement, for every full rotation of the actuator shaft 54 with the sun gear 60, the planet is only rotated forward in a stepped rotational amount when the toothed section 62 of the sun gear 60 contacts the teeth 74 of the planet gear 72. While the epicyclic gear arrangement 58 described in connection with the first preferred embodiment is as described above, other epicyclic gear arrangements can be utilized in which the sun or planet gears are held stationary instead of the ring, but still incorporate some form of partial gearing between the valve body and actuator.

This arrangement allows the associated fluid flows in the first fluid chamber 14A with the first valve body 22 to be adjusted continuously across the range of motion outside of the toothed segment 62 of the sun gear 60 without altering the position of the second valve body 40.

In the first preferred embodiment, the first and second valve bodies 22, 40 are shaped as spheroids or spherical frustums. Seals can be provided in the housing 12 at the locations of the first and second ports 16A, 18A as well as the third and fourth ports 16B, 18B. The optional fifth port 18C shown in connection with the second flow chamber 14B and controlled by the second valve body 40 can also be provided with a seal. Alternatively, sufficient sealing can be achieved by a sliding fit between the respective valve bodies 22, 40 and the walls of the housing 12 at the associated inlets and outlets, avoiding the need for additional seals.

The housing 12 as well as the intermediate wall 20 can be made of a metallic or polymeric material. Additionally, the valve bodies 22, 40 can also be made of polymeric or metallic materials. Preferably, the valve bodies are made of a polymeric material. The gears may also be made of polymeric or metallic materials, depending upon the particular application.

Referring now to FIGS. 6-8, a second embodiment of a rotary valve module 110 in accordance with the present invention is shown. As shown in FIG. 6, the second embodiment of the rotary valve module 110 includes a housing 112 with an axial inlet port 115 as well as first, second, third, and fourth radial ports 116A, 118A, 116B, 118B, which in one preferred arrangement comprise inlet ports 116A and 116B and outlet ports 118A and 118B. Additional ports, such as outlet port 118C can be provided. The axial inlet port 115 is preferably located at one end of the housing 112 and is supported by a flange 112A on the housing 112.

As shown in FIG. 6, an actuator shaft 154 is used to actuate the rotary valve module 110 and the shaft is preferably connected to an actuator, represented by arrow 152. The actuator 152 can be any type of suitable rotary actuator, including a stepper motor or other rotary drive.

Referring to FIGS. 7 and 8, the housing 112 has been removed to show the first valve body 122. The first valve body 122 includes an outer wall 124 of at least one fluid pathway defined by an opening 126. The first valve body 122 is preferably in the form of a spheroid or spherical frustum. The first valve body 122 is preferably press fit or otherwise rotationally fixed upon the actuator shaft 154. The second valve body 140 is also shown and, in a similar manner to the first embodiment of the rotary valve module 10 discussed above, it is driven by an epicyclic gear arrangement 158 which is shown in detail in FIGS. 8-10.

As shown in FIGS. 8-10, the epicyclic gear arrangement 158 includes a drive gear 178 located on the actuator shaft 154. The drive gear 178 is preferably press fit in position. The drive gear 178 includes a toothed segment 180 extending over a portion of a circumference thereof. A shelf 181 is located on the non-toothed portion of the drive gear 178 that allows for disengagement from an idler gear 182. One preferred embodiment of the drive gear 178 is shown in detail in FIGS. 25-28.

Still with reference to FIGS. 8-10, the idler gear 182 is rotatably mounted on the housing 112 preferably via a flange 202 that is connected via a bolt 204 to the housing 112. As shown in FIG. 10, the flange supports a pin 206 upon which the idler gear 182 rotates. The idler gear 182 is engagable with the toothed segment 180 of the drive gear 178 via idler gear teeth 184. At least some of the idler gear teeth 184 include a cut feature 186 that allows the drive gear 178 to rotate with its shelf 181 through the cut feature 186 without engaging the idler gear 182 when the drive gear toothed segment 180 is out of contact with the idler gear teeth 184. As best shown in FIG. 10, the shelf 181 rotates with the drive gear 178 as the actuator shaft 154 is turned when the toothed segment 180 is out of engagement with the idler gear 182, and passes through the cut feature 186 in the aligned idler gear tooth 184. The shelf 181 rotates in proximity to the two neighboring teeth 184 without the cut feature 186 in order to prevent movement of the second valve body 140 as discussed below, providing a stop feature when the toothed segment 180 of the drive gear 178 is out of engagement with the idler gear 184. One preferred embodiment of the idler gear is shown in detail in FIGS. 14-17.

Still with reference to FIGS. 8-10, a driven gear 188 is attached to the second valve body 140 and is in engagement with the idler gear 182 such that movement of the drive gear 178 via the actuator shaft 154 when the toothed segment 180 is in engagement with the idler gear 182 results in a rotary positioning movement of the second valve body 140. Thus, rotation of the shaft 154 when a toothed segment 180 of the drive gear 178 is in engagement with the teeth 184 of the idler gear 182 results in a direct drive of the second valve body 140 via the driven gear 188 attached thereto or formed thereof. However, when the toothed segment 180 of the drive gear 178 rotates out of engagement with the idler gear 182, the shelf 181 on the drive gear rotates through the cut feature 186 on the aligned idler gear tooth 184, and neighboring ones of the teeth 184 without the cut feature 186 prevent the idler gear 182 from rotating via contact with the shelf 181, locking the idler gear 182 and the driven gear 188 attached to the second valve body 140 in position.

FIGS. 11-13 shown detailed views of the second valve body including the outer wall 142 and openings 144 that form the fluid pathways through the second valve body 140. Arms 148 extend from the outer wall 142 to a center hub 146 located beneath the driven gear 188. A stop pin 151 may also depend from a bottom of the outer wall 142 in order to contact a corresponding stop 143 (shown in broken lines in FIG. 6) on the housing 112 limiting the rotation of the second valve body 140 to about 360° or less. As shown in FIGS. 11-13, the second valve body 140 is preferably in the form of a spheroid or spherical frustum. The stop 151 can engage a counter stop 143, shown in broken lines in FIG. 6 in the housing 112 in order to provide a hard stop for at least one of position verification or calibration.

Referring now to FIGS. 8 and 18-21, in a further aspect of the second embodiment of the rotary valve module 110, a stop arrangement 190 for the first valve body 122 is provided for at least one of position verification or calibration. The stop arrangement 190 allows for multiple complete rotations of the first valve body 122 in order to permit positioning of the second valve body 140 over approximately 360° or less.

Figure 29:
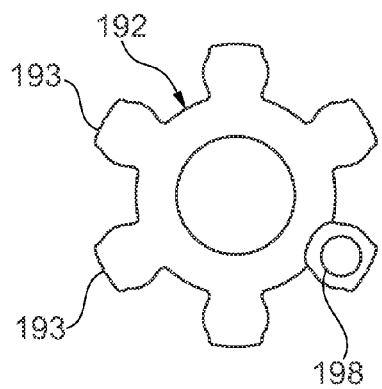
FIG. 29 is a top view of a stop idler gear used in connection with the position of the first valve body shown in detail in FIGS. 19-21.
Figure 30:
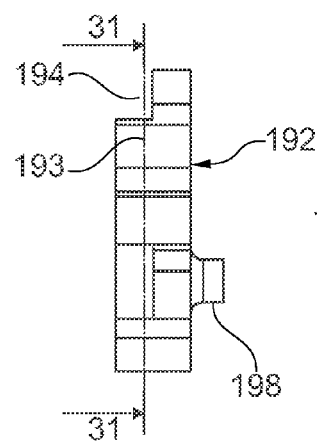
FIG. 30 is a side view of the stop idler gear shown in FIG. 29.
Figure 31:
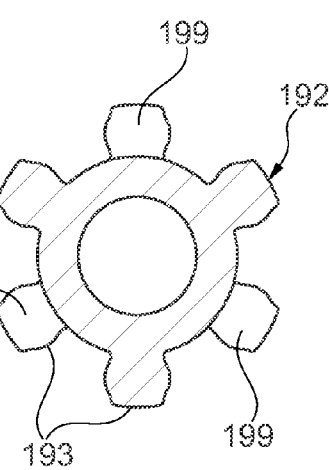
FIG. 31 is a cross-section view taken along line 31-31 in FIG. 30.

The stop arrangement 190 includes a stop idler gear 192, shown in detail in FIGS. 29-31, that engages with a partial gearing 194 on the first valve body 122. The stop idler gear 192 is mounted freely to rotate via a pin 196 mounted on the housing 112, and more preferably on the flange 112A for the axial inlet 115. The idler gear 192 engages with the partial gearing 194 as the first valve body 122 rotates through a full rotation to step the stop idler gear 192 forward by a fixed number of teeth. As shown in detail in FIG. 21, the fixed number of teeth in the preferred embodiment is two for each revolution of the first valve body 122, although this could be varied depending upon the particular application. Preferably, a stop projection 198, shown in detail in FIG. 30, extends from the stop idler gear 192 and contacts a fixed counter-stop on the housing 112. In the preferred embodiment, the fixed counter-stop is on the flange 112A used to connect the axial inlet 115 to the housing 112. This limits the possible number of rotations of the first valve body 122 in each direction which is important for tracking and calibration of the rotational positions of the valve bodies 122, 140.

Still with reference to FIGS. 18-21, the stop arrangement 190 preferably also includes a locking arrangement to prevent rotation of the stop idler gear 192 when the partial gearing 194 on the first valve body 122 is out of contact with the stop idler gear 192. Here, as shown in FIGS. 30 and 31, some of the teeth 193 on the stop idler gear 192 include a cut feature 199. The first valve body 122 includes a rim 195 in an area which does not have the partial gearing 194, as shown in FIGS. 22-24. The rim 195 is rotatable through the cut features 199 without moving the stop idler gear 192 as the first valve body 122 rotates. The neighboring teeth 193 of the stop idler gear 192 without the cut feature prevent rotation of the stop idler gear 192 due to the position of the rim 195 contacting or being in close proximity to these neighboring teeth 193.

As in the first embodiment of the rotary valve module 10, an intermediate wall may be located in the housing 112 between the first and second valve bodies 122, 140 to define independent first and second flow chambers. Alternatively, as shown, both valve bodies 122, 140 can be located within the single flow chamber 114.

In the preferred embodiment of the second rotary valve module 110, the valve bodies 122, 140 are spherical frustums or spheroids, as shown. Seals may be provided between the housing 112 and the valve bodies 122, 140 or sealing contact may be made via direct contact of the valve bodies with the inside of the housing 122 in the area of the inlet ports 116A, 116B and the outlet ports 118A, 118B as well as any additional inlet or outlet ports, such as 118C, that are provided on the housing 112 in proximity to the valve bodies 122, 140.

In the second embodiment of the rotary valve module illustrated in FIGS. 6-31, each rotation of the actuator shaft 154 results in a 90° rotation of the second valve body 140. However, by varying the number of teeth on the drive gear 178, this can be varied based on particular applications.

The stop feature for the second valve body 140 is preferred for position verification and calibration purposes. Once the position of the second valve body 140 is verified, this eliminates the need for a separate sensor other than tracking the position of the rotary actuator 152 that is connected to the actuator shaft 154. The stop arrangement 190 for the first valve body 122 is also preferred for verification and calibration of the rotary valve module 110 since the first valve body 122 will advance multiple full rotations in order to position the second valve body 140. As will be appreciated by those skilled in the art, the stop features and supports for the various idler gears used in connection with the stop features can be located on the housing, ports, or other stationary components.

While the epicyclic gearing arrangement 58, 158 is preferred for operating the rotary valve modules 10, 110 in accordance with the present invention, those skilled in the art will recognize that other intermittent rotation arrangements can be provided, such as a Geneva drive used to intermittently drive the idler gear.

Having thus described the present invention in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. A rotary valve module, comprising:
a housing with a flow chamber;
first, second, third, and fourth ports connected to housing in communication with the flow chamber;
a first valve body rotatably positioned in the flow chamber, the first valve body including at least one fluid pathway that connects at least one of the first port or the second port to the flow chamber in a first rotational position, and prevents flow from the at least one of the first port or the second port in a second rotational position;
a second valve body rotatably positioned in the flow chamber, the second valve body including at least a second fluid pathway that connects at least one of the third port or the fourth port to the flow chamber in a first rotational position of the second valve body, and prevents flow from the at least one of the third port or the fourth port in a second rotational position of the second valve body;
an actuator arrangement controls the positions of the first and second valve bodies, and includes an actuator shaft that extends axially through the valve bodies that is connected rotationally fixed to the first valve body, and includes an epicyclic gear arrangement connected to the actuator shaft for driving the second valve body such that movement of the actuator shaft directly positions the first valve body and results in only a partial rotary movement of the second valve body for independent positioning of the first and second valve bodies via a single actuator connected to the shaft.

2. The rotary valve module of claim 1, wherein the epicyclic gear arrangement comprises a sun gear connected to the actuator shaft, the sun gear including a toothed segment extending only a portion of a circumference thereof, a ring gear connected to the housing, and a planet gear supported on the second valve body that is engaged with the ring gear, the planet gear intermeshes with the sun gear toothed segment during only a part of each revolution of the actuator shaft.

3. The rotary valve module of claim 1, wherein an intermediate wall divides the flow chamber into first and second flow chambers, and the first valve body is located in the first flow chamber and the second valve body is located in the second flow chamber.

4. The rotary valve module of claim 3, wherein the actuator shaft passes through the intermediate wall.

5. The rotary valve module of claim 1, wherein the valve bodies are spherical frustums or spheroids.

6. The rotary valve module of claim 1, wherein the epicyclic gear arrangement comprises a drive gear located on the actuator shaft, the drive gear includes a toothed segment extending only a portion of a circumference thereof and a shelf on a non-toothed portion that allows for disengagement from an idler gear, the idler gear is rotatably mounted on the housing and is engagable with the toothed segment of the drive gear, the idler gear includes a cut feature through at least some of the teeth that allows the drive gear to rotate without engaging the idler gear when the drive gear toothed segment is out of contact with the idler gear teeth, and a driven gear is attached to the second valve body and is engagement with the idler gear, such that movement of the drive gear when the toothed segment is in engagement with the idler gear results in a rotary positioning movement of the second valve body.

7. The rotary valve module of claim 6, the shelf, the cut feature and the teeth without the cut feature provide prevent movement of the second valve body when the toothed segment of the drive gear is out of engagement with the idler gear teeth via the shelf on the drive gear being rotatable through the cut feature on one of the idler gear teeth, and neighboring ones of the teeth without the cut feature prevent the idler gear from rotating via contact with the shelf, locking the idler gear and the driven gear that is attached to the second valve body in position.

8. The rotary valve module of claim 6, further comprising a stop located on the second valve body that can engage against a counter-stop on the housing in order to provide a hard stop for at least one of position verification or calibration.

9. The rotary valve module of claim 6, further comprising a stop arrangement for the first valve body for at least one of position verification or calibration, the stop arrangement allows for multiple complete rotations of the first valve body to permit positioning of the second valve body.

10. The rotary valve module of claim 9, wherein the stop arrangement includes a stop idler gear that engages with a partial gearing on the first valve body, the stop idler gear is mounted to freely rotate via a pin mounted on the housing and engages with the partial gearing as first valve body rotates through a full rotation to step the stop idler gear forward by a fixed number of teeth.

11. The rotary valve module of claim 10, wherein a stop projection extends from the stop idler gear that contacts a fixed counter-stop on the housing.

12. The rotary valve module of claim 10, wherein the stop arrangement includes a locking arrangement to prevent rotation of the stop idler gear when the partial gearing on the first valve body is out of contact with the stop idler gear, at least some teeth on the stop idler gear include a cut feature, and the first valve body includes a rim in an area that does not have the partial gearing, the rim is rotatable through the cut feature without moving the stop idler gear as the first valve body rotates, and neighboring teeth of the stop idler gear without the cut feature prevent rotation of the stop idler gear.

13. The rotary valve module of claim 6, wherein an intermediate wall is located in the housing between the first and second valve to define independent first and second flow chambers.

14. The rotary valve module of claim 6, wherein the valve bodies are spherical frustums or spheroids.

* * * * *